Patented Jan. 10, 1950

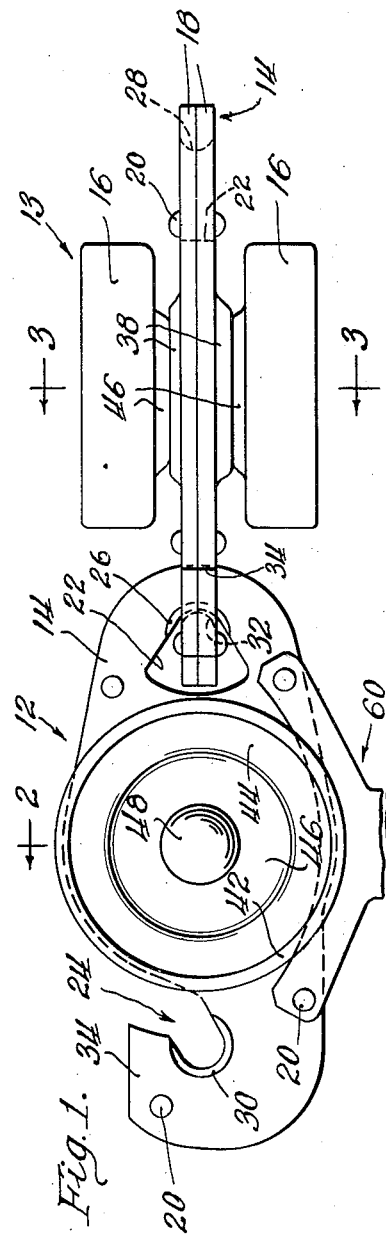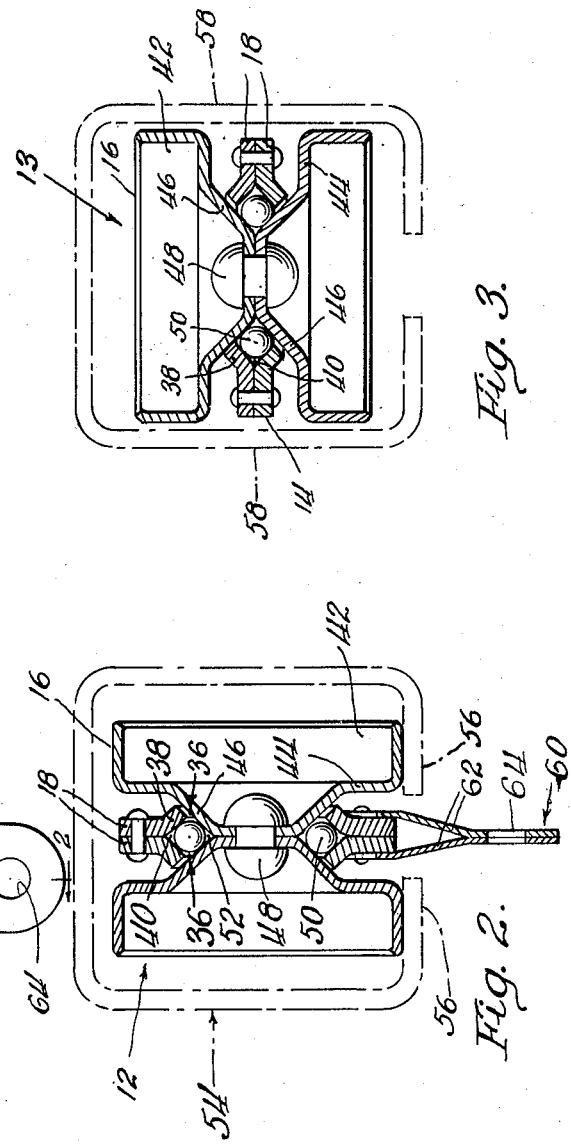

2,494,009

UNITED STATES PATENT OFFICE 2,494,009

CONVEYER CHAIN

Allen Sharp, Ottumwa, Iowa, assignor to Barker Poultry Equipment Company, Ottumwa, Iowa, a corporation of Iowa Application June 4, 1947, Serial No. 752,315

4 Claims. (Cl. 104—94)

This invention relates to conveyor chains having alternate links disposed transversely of each other for traveling in a track member and turning bends in planes which are transverse to each other.

One of the objects of the present invention is the provision of a conveyor chain the links of which are made from a minimum of parts.

Another object is the provision of a conveyor chain which is simple in construction and unusually strong.

A further object of the invention is the provision of such a conveyor chain in which all of the main parts of the links of the chain are made of stampings.

The chain comprises links each of which includes a flat plate-like link element having a transverse opening therethrough in which are mounted a pair of wheels.

A further object of the present invention is the provision of such a flat plate-like link element having a bearing race formed in the body of the link element.

A still further object of the invention is the provision of interconnected wheels for the link element having portions intercooperating to form another bearing race cooperating with the bearing race formed in the body of the link element.

With these and other objects in view, my invention consists in the construction, arrangement and combination of the various parts of my device whereby the objects contemplated are attained as hereinafter more fully set forth, pointed out in my claims and illustrated in the accompanying drawing, wherein:

Figure 1 is a side elevational view of two links interconnected to form a segment of a chain;

Figure 2 is a sectional view taken on line 2—2 of Figure 1 and showing a track element in dot-dash lines; and Figure 3 is a sectional view taken on line 3—3 of Figure 1, this view also showing a track element in dot-dash lines.

Referring now in detail to the drawings: Figure 1 illustrates two links which are identical but disposed in different positions, and the positions which alternate links assume in a chain made up of a greater number of the links.

Two links are indicated in their entirety at 12 and 13, 12 being vertically disposed, and 13 horizontally disposed. Each link includes a flat plate-like link element 14 and a pair of wheels 16. Each link element 14 is made up of a pair of flat plates 18 secured together by a plurality of rivets 20. It will be understood that the rivets 20 may be positioned at various points in the link element 14 as desired to secure the greatest strength of the link element. The plates 18 are provided with registering holes 22 at one end and registering notch portions 24 at the opposite end. The holes 22 are tapered toward the respective end of the link element 14 and at the apex of the tapered portion is a rounded surface 26, the cross sectional shape of which may be seen at 28 in dotted lines at the far right of link 13 in Figure 1.

The notches 24 are also provided with similar rounded portions 30, the cross sectional shape of which appears at 32 in dotted lines at the connecting points between the links in Figure 1.

Each notch 24 is under-cut toward the respective end of the link element 14, leaving a hook formation 34. The links 12 and 13 are connected together by inserting the hook portion 34 of one link through the hole 22 in the adjacent link, and the portion of the end of the link member beyond the tapered apex of the hole 22 fits into the undercut portion of the notch 24.

The curvature in cross section of the portion 30, as shown at 32, is of smaller radius than the vertical curvature of the rounded portion 26 so that the links when in engagement have substantial point contact therebetween. This relationship is of course present in all of the points of engagement between adjacent links, as if another link 12 were positioned at the right of Figure 1 in the same vertical position that the link 12 is now illustrated.

The plate members 18 are stamped and provided with a central opening indicated generally at 36. The marginal edges of each opening 36 are flared away from each other outwardly from the planes of the respective plates, as indicated at 38, forming a ball race 40 therebetween. The ball race 40 is V shape in cross section and of course surrounds the opening of the link element 14.

Each wheel 16 is also a stamping, in the form of a cup, and includes a tread member 42, a web element 44 and a central axial tapered portion 46 having a central flattened portion with a hole therethrough. The outer marginal edge of the tread portion 42 may be crimped inwardly slightly.

The tapered portions 46 of the wheels 16 are inserted into the central opening 36 of the link member, and secured rigidly together by a rivet 48 with the central flattened portions of the tapered portions 46 in tight abutting relation.

A plurality of bearing balls 50 are inserted in the bearing race 40, which of course must be done before the wheels are put in position. The tapered portions 46 also form a bearing race 52 similar to and cooperating with the race 40, for retaining the bearing balls 50 in place. The assembly of the wheels 16 therefore supports the link member through the bearing balls 52. The flared elements 38 extend to a point closely adjacent the tapered portions 46 so that the bearing balls will remain in place.

Figures 2 and 3 illustrate how the conveyor chain cooperates with a track element. The numeral 54 illustrates a common type of monorail with which the present chain is particularly adapted to cooperate. The vertical link 12 travels through the track 54 with the respective wheels 16 bearing on the lower inturned portions 56 of the track. Alternate horizontal links 13 are suspended and supported by the adjacent vertical links 12 in the position illustrated in Figure 3 when traveling in a straight direction or traveling around bends in a vertical plane. However when the chain makes a turn in a horizontal plane, the wheels 16 of the link 13 in Figure 3 bear against one or the other of the vertical sides 58 of the track. The conveyor chain will follow compound turns in both vertical and horizontal planes with equal effectiveness.

Means are provided for suspending articles from the conveyor. A pendant or bracket 60 may be secured to certain of the vertical links 12. The pendant 60 is preferably made up of a pair of stamped plates 62, one on each side of the link element 14, being secured thereon by rivets 20 which hold the link plates 18 together. The lower ends of the plates 62 may be spot welded together. A hole 64 is provided in the pendant for hooking articles thereon. The pendant 60 then extends downwardly in the channel between the bottom elements 56 of the track and articles can be supported thereon. The selection of the links to which the pendants 60 are to be secured may be made depending on the intervals at which it is desired to suspend articles.

It is of course understood that with the exception of the pendants 60, which are secured to only certain of the links as desired, all of the links in the chain are identical and any link may be substituted for or may replace any other link.

It is obvious from the foregoing that I have conceived a link made of a minimum of parts which affords great economy in the manufacture of the chain. The links are exceedingly strong; both the link elements 14 and the wheels 16 are capable of sustaining great loads. The shape and proportions of the tapered portions 46 and the flared portions 38 are such that the links are compact and unnecessary play between the wheels and link elements is eliminated. It will also be noted that an unusually effective construction has been provided having anti-friction bearings.

While I have herein shown and described a preferred embodiment of my invention, manifestly it is susceptible of modification and rearrangement of the parts without departing from the spirit and scope thereof. I do not, thereby, wish to be understood as limiting my invention to the precise form herein disclosed, except as I may be so limited by the appended claims.

I claim as my invention:

1. A conveyor chain link comprising, in combination, a pair of flat plates secured together and having registering openings therethrough, the marginal edges of said openings being flared away from each other outwardly from the planes of the respective plates, and a pair of wheels, each wheel having an axial tapered projection terminating in a flat face, said tapered portions extending into said openings with said flat faces abutting, said flat faces and thereby said wheels being secured rigidly together, said tapered projections forming a bearing race co-operating with said first race, and a plurality of bearings in said races.

2. A conveyor chain link comprising, in combination, a flat plate-like link element having an opening therethrough, the marginal edge of said opening having a bearing race formed therein, and a pair of wheels, each wheel having an axial tapered projection terminating in a flat face, said tapered portions extending into said openings with said flat faces abutting, said flat faces and thereby said wheels being secured rigidly together, said tapered projections forming a bearing race co-operating with said first race, and a plurality of bearings in said races.

3. A conveyor chain link comprising, in combination, a flat plate-like link element made up of a pair of plates rigidly secured together in abutting relation, the ends of said plates having registering cut out portions for inter-engaging adjacent links in a chain, said plates having registering openings therethrough, the marginal edges of said openings being flared outwardly to form a bearing race, and a pair of wheels, each wheel having an axial tapered projection terminating in a flat face, said tapered portions extending into said openings with said flat faces abutting, said flat faces and thereby said wheels being secured rigidly together, said tapered projections forming a bearing race race co-operating with said first race, and a plurality of bearings in said races.

4. A conveyor chain link comprising, in combination, a pair of plate stampings rigidly secured together in abutting relation and having registering openings therethrough, the marginal edges of said openings being flared away from each other outwardly from the planes of the respective stampings, the flared portions forming a bearing race, a plurality of bearing members in said race, and a pair of wheels, each of said wheels being a cup-shaped stamping and having a central axial tapered projection terminating in a flat face of substantial radial extent, said projections extending into said openings from opposite sides of the link and rigidly secured together with their flat faces abutting, the tapered surfaces of said projections forming a bearing race for said bearing members.

ALLEN SHARP.

REFERENCES CITED

The following references are of record in the file of this patent:

UNITED STATES PATENTS

| Number | Name | Date |
| --- | --- | --- |
| 955,599 | Laughlin et al. | Apr. 19, 1910 |
| 1,067,725 | Flugger | July 15, 1913 |
| 2,187,498 | Landahl | Jan. 16, 1940 |
| 2,372,199 | Hassler | Mar. 27, 1945 |